April 15, 1924.
A. E. KRICK
1,490,569
PROCESS OF DRYING CONTROL
Filed Oct. 27, 1923
4 Sheets-Sheet 1
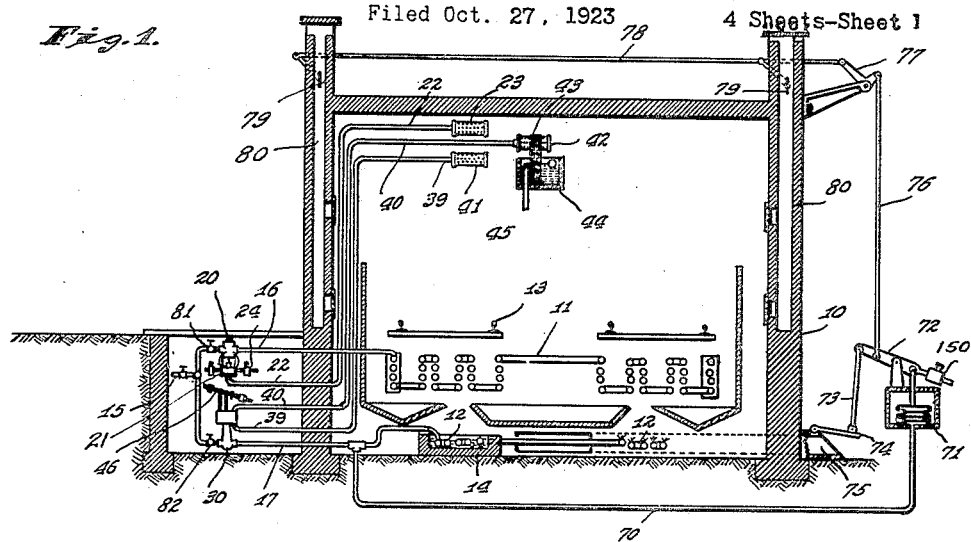
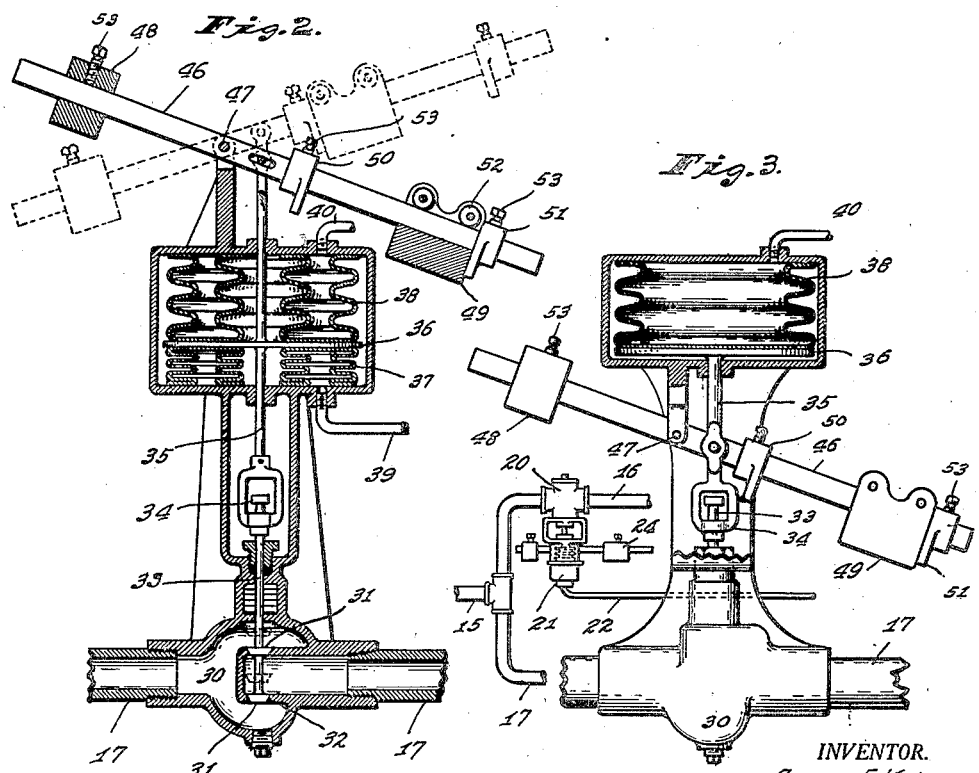
INVENTOR.
ARTHUR E. KRICK,
BY
ATTORNEY.

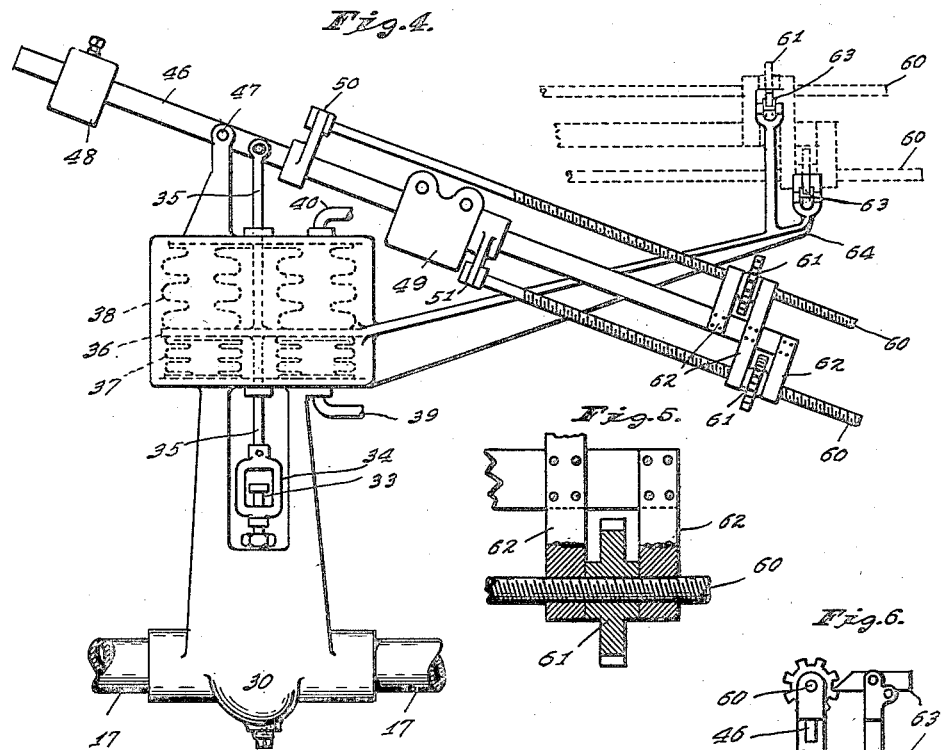
Fig.4.
Fig.5.
Fig.6.
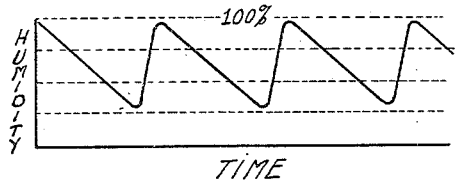
Fig.7.
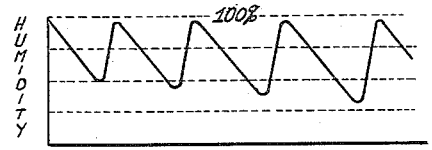
Fig.9.
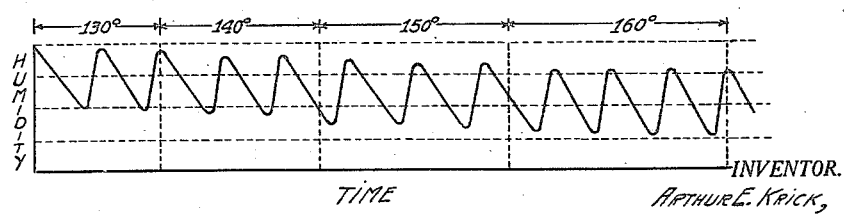
Fig.8.

April 15, 1924.
A. E. KRICK
1,490,569
PROCESS OF DRYING CONTROL
Filed Oct. 27, 1923
4 Sheets-Sheet 3
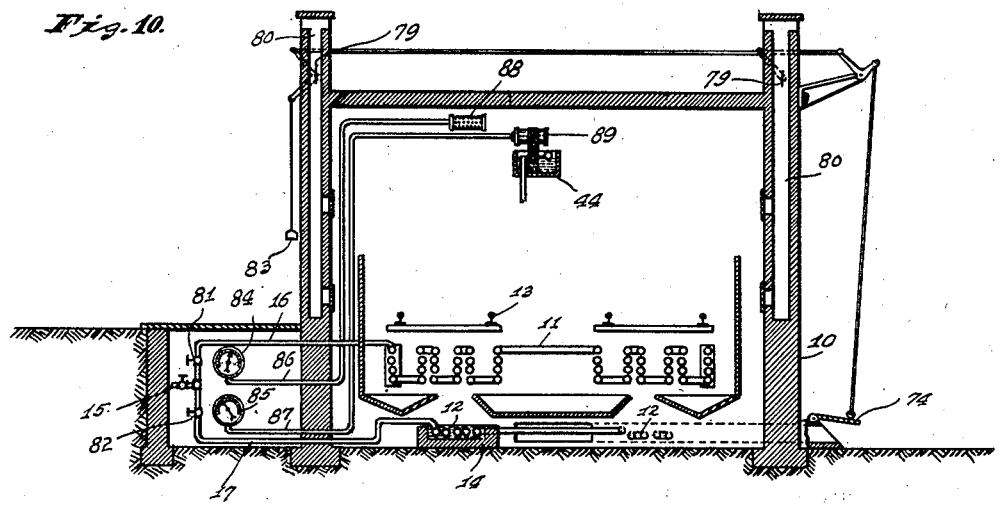
Fig. 10.
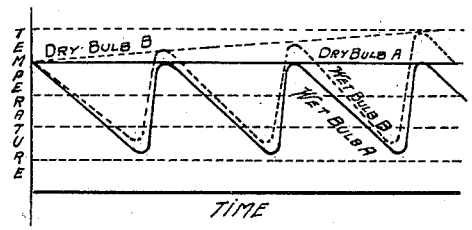
Fig. 11.
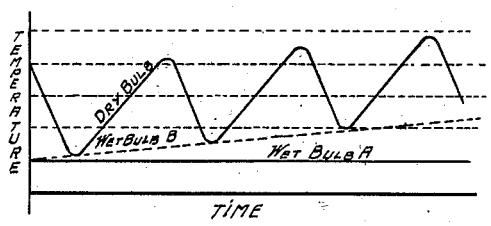
Fig. 12.
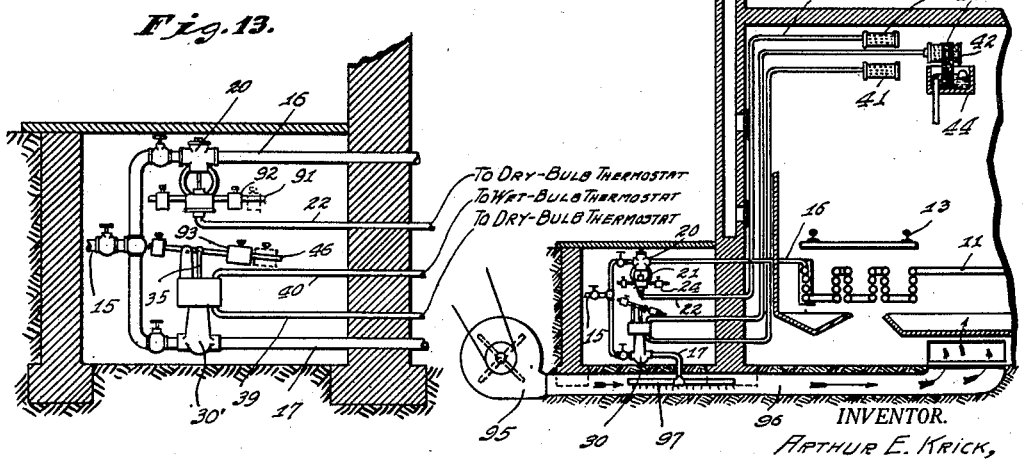
Fig. 13.
Fig. 14.
INVENTOR.
ARTHUR E. KRICK,
BY
ATTORNEY.

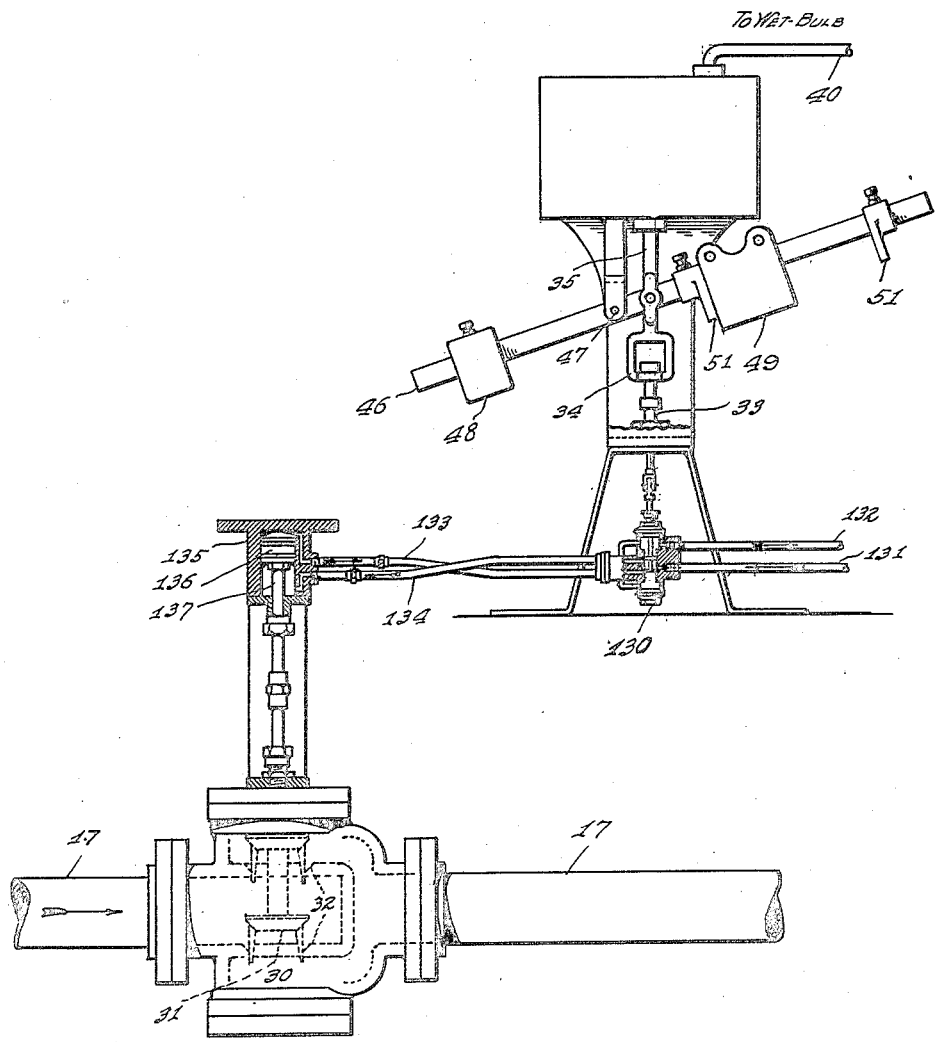

Patented Apr. 15, 1924.

1,490,569

UNITED STATES PATENT OFFICE.

ARTHUR E. KRICK, OF DANVILLE, INDIANA.

PROCESS OF DRYING CONTROL.

Application filed October 27, 1923. Serial No. 671,111.

*To all whom it may concern:*

Be it known, that I, ARTHUR E. KRICK, a citizen of the United States, residing at Danville, in the county of Hendricks and State of Indiana, have invented a new and useful Process of Drying Control, of which the following is a specification.

It is the object of my invention both to improve and accelerate kiln-drying, with especial reference to the drying of lumber.

This present application is in part a continuation of my prior but co-pending application Serial No. 551,053, filed April 10, 1922, for drying-control apparatus, and illustrates the apparatus of such co-pending application as one means for carrying out the process which is the subject of the present application; but this present application also illustrates other apparatus by which the process may be practiced.

Heretofore in the kiln-drying of lumber, as well as of other things, it has been necessary to maintain comparatively high relative humidities and comparatively low temperatures during the first part of the operation, usually for at least half of the entire drying time or longer, in order to keep the lumber from cracking, splitting, hollow-horning, and case-hardening. This was so even though usually a slow lowering of the relative humidity throughout the drying period was provided. Even by doing this, the best results were not always obtained, and the defects mentioned above to be guarded against nevertheless frequently appeared; and in addition the maintenance of these high relative humidities and low temperatures so far into the drying period made a long drying period necessary.

According to my present invention I greatly lessen the time required for drying, and yet obtain equally as good results if not better results in the quality of the dried lumber.

I do this, fundamentally, by departing entirely from the time-honored practice of attempting to maintain the relative humidity high and substantially constant for a given period. Instead, I periodically and alternately lower such relative humidity to very low values and then raise it to high values. The low values are so low that they would be unsafe if continued, because they would result in cracking, splitting, hollow-horning, and case-hardening of the wood, and the consequent rendering of the wood unfit for most uses. I start these wide variations in relative humidity at or near the beginning of the drying period, and continue them through at least a large part of the drying period and preferably to the end thereof. In addition, I preferably follow each such decrease very shortly by an increase, especially during the early part of the drying period. These wide variations in relative humidity markedly increase the rate of drying, for the early and repeated lowering of the relative humidity removes moisture from the lumber and especially from the surface of the lumber most effectively, and the repeated raisings of the relative humidity soften the surface of the lumber by the deposit of moisture, and thus keep such surface in condition to permit the passage of moisture through the superficial parts of the lumber from the interior thereof. The high values of relative humidity are preferably at or very close to saturation, especially during the early stages of the drying.

I preferably control this lowering and raising of the relative humidity by the rise and fall to predetermined values of the moisture-value conditions of the air. The controlling moisture-value conditions of the air may involve either the wet-bulb temperature alone, or both the wet-bulb temperature and the dry-bulb temperature, and in the latter case may be either the relative humidity of the air or some differential value between the wet-bulb temperature and the dry-bulb temperature. I prefer that in the fluctuations of relative humidity, the relative humidity shall be raised rapidly and lowered slowly, and that the rise shall stop when the desired high moisture-value condition of the air is reached, and that the fall shall continue until moisture is being given off by the lumber so slowly that the controlling moisture-value condition of the air in the kiln falls to the predetermined low value.

Preferably I raise the relative humidity of the air by discharging live steam into the kiln. This not only raises the relative humidity of the air, but also temporarily raises to some extent the temperature even within the interior of the lumber, largely by reason of the latent heat which the humidifying steam gives up as it condenses. This is in addition to the adding of moisture to the lumber at or near the surface to permit the readier passage therethrough of moisture from the interior.

Thus the relative humidity of the air is very much lower on the average than has heretofore been the practice, and is especially so in the early part of the process. This decreases the time required for drying. The periodic and sharp increases in the relative humidity of the air assist in this, by maintaining the surface portions of the lumber in suitable condition for rapid drying, and by producing a recurrent condition of greater temperature within the body of the lumber than on the surface of the lumber and in the air in the kiln, thereby promoting the driving out of the moisture from the interior. This recurrent adding of superficial moisture to the surface of the lumber effectively prevents splitting, cracking, hollow-horning, and case-hardening. Moreover, I find that this makes it possible to increase very materially the drying temperature, without injuring the quality of the dried lumber obtained, which makes further for acceleration of the drying process.

The accompanying drawings illustrate different types of apparatus suitable for practicing my invention, and diagrams showing the effects produced thereby. Fig. 1 is a transverse section through a kiln equipped with an automatic control arrangement which I preferably use in practicing my invention, with the heating and humidifying means shown diagrammatically; Fig. 2 is a section through the humidifying-steam control valve and its operating means, illustrated in Fig. 1, with the valve controlled in response to both dry-bulb and wet-bulb temperatures; Fig. 3 is a view in general similar to Fig. 2, but with the control-valve controlled in response to the wet-bulb temperature alone; Fig. 4 is a view somewhat similar to Fig. 3, but with automatically movable stops for the sliding weight; Fig. 5 is an enlarged sectional detail of one of the stop-shifting wheels of Fig. 4; Fig. 6 is an end view of the lever and stop-shifting wheels of Fig. 4, with the co-operating shifting dogs; Figs. 7, 8, and 9 are rather idealized time-humidity diagrams indicating the effects of the operation of the controlling means in Figs. 2, 3, and 4, respectively; Fig. 10 is a view similar to Fig. 1, but with manual control instead of automatic control; Figs. 11 and 12 are rather idealized time-temperature diagrams indicating different effects which can be secured in practicing my invention; Fig. 13 is a view of a control pit equipped with automatic control valves in which the weights are manually adjustable, and there is no sliding weight of the character shown in Figs. 2, 3, and 4; Fig. 14 is a view somewhat similar to Fig. 1, with the air supplied by a forced draft, and the humidification-control acting to control the humidity of the air supplied to the kiln by such forced drafts; and Fig. 15 is an elevation, in partial section, of an automatic control apparatus arranged to exert its controlling action through a pilot valve to produce the humidification-control contemplated by my invention.

In practicing my invention, I prefer to use an automatic-control apparatus such as that shown in Figs. 1 to 6, inclusive, which produces a control-effect, such as shown in Figs. 7, 8, and 9 inclusive, by variations in wet-bulb temperature either alone or in conjunction with variations in dry-bulb temperature; which apparatus forms the specific subject-matter of my aforesaid co-pending application. Therefore, I shall first describe my invention in connection with that automatic apparatus, and with especial reference to Figs. 1 to 9 inclusive.

The dry-kiln 10 may be of any desired type, with any suitable heating means 11 and with any suitable air-humidifying means 12, and with any suitable arrangements for supporting the lumber or other material to be dried, such as the tracks 13 for supporting trucks which carry such lumber. As shown in Fig. 1, both the heating means 11 and the air-humidifying means 12 are steam coils. They are shown below the tracks 13, but this is immaterial; and the air-humidifying coils are shown as being in part coils located in water in a water-tank 14, to produce evaporation of water from such tank, and in part as steam-spray coils, which latter type I prefer, though either type of air-humidifying coils may be used alone, or other types of air-humidifying means may be used instead. The steam for both heating and humidification is shown as being supplied from a main steam-supply line 15, which is branched to provide a supply line 16 leading to the heating coils 11 and a supply line 17 leading to the air-humidifying coils 12.

In the supply line 16 to the heating coils 11 is a control valve 20, which in the preferred automatic control arrangement shown in Fig. 1 is operated by a fluid pressure motor-member 21 connected by a pipe 22 to a suitable vapor-pressure thermostat 23 within the kiln 10. The valve 20 is automatically operated to maintain substantially normal the temperature within the kiln 10; for if the temperature rises in the kiln the vapor-pressure developed in the thermostat 23 also rises to cause the motor-member 21 to move the valve 20 toward closed position, to cut down the supply of heating steam to the heating coils 11; while if the temperature falls the reverse series of actions takes place, to increase the supply of steam to the heating coils 11. The motor-member 21 and valve 20 are conveniently provided with suitable adjusting means, such as an adjustable weight 24, by which the temperature which is maintained in the kiln may be varied from time to time, as the drying proceeds.

In the supply line 17 to the air-humidifying means 12 is a control valve 30. In the preferred automatic-control apparatus, this valve 30 is desirably a balanced valve, having a twin valve-member 31 movable with relation to twin valve-seats 32 to open and close the valve. The valve-member 31 has a valve stem 33, which is connected through a lost-motion connection 34 to a shifter rod 35. The shifter rod 35 is controlled in response to variations in moisture-value of the air within the kiln 10 to open the valve 30 when such moisture-value drops to a certain low value, say 30% relative humidity, and to close such valve 30 when such moisture-value rises to a certain high value, say 98% relative humidity, but to be without effect on the valve for intermediate moisture-values. In consequence, when the valve 30 is closed, the relative humidity drops gradually until the low moisture-value is reached; whereupon the valve 30 is opened to admit air-humidifying steam, to cause the relative humidity to rise until the high moisture-value is reached; whereupon the valve 30 is again closed, and the cycle is repeated. The drop in relative humidity is relatively slow, and the rise relatively rapid.

One simple form of mechanism for doing this is shown in Figs. 1 and 2. This arrangement makes use of the invention set forth in my prior patent No. 1,315,517, granted September 9, 1919. In such arrangement shown in Figs. 1 and 2, the shifter rod 35 is provided with a thrust-plate 36, which is acted on in opposite directions by two fluid-pressure expansible motor-members 37 and 38, which are connected by two pipes 39 and 40 to two vapor-pressure thermostats 41 and 42 respectively. The thermostat 41 is a dry-bulb thermostat, and the pressure therefrom acts in the motor-member 37 to tend to open the valve 30. The thermostat 42 is a wet-bulb thermostat, and the pressure therefrom acts in the motor-member 38 to tend to close the valve 30. The wet-bulb thermostat 42 may be kept wetted in any suitable way, as by a wick 43 which overlies such wet-bulb thermostat and dips into water maintained at a constant level in a water-tank 44 by a suitable float-valve 45. The shifter rod 35 is connected to a lever 46, suitably mounted on a fixed pivot 47. The lever 46 carries a normally fixed but adjustable weight 48, for adjusting in common the points at which the valve operates; and also carries a shifting weight 49 which is arranged to slide along the lever 46 between two stops 50 and 51. To reduce the sliding friction, the weight 49 is preferably carried by rollers 52 which travel on the upper face of the lever 46. The stops 50 and 51 may be adjusted along the lever 46, to control separately the points of high-humidity and low-humidity at which the valve operates; and in the arrangement shown in Figs. 2 and 3 are manually adjustable, and provided with set-screws 53 by which they are clamped in adjusted position.

In the operation of the device shown in Figs. 1 and 2, assume that the valve 30 is closed, so that no air-humidifying steam is being supplied to the coils 12, and also assume that the lever 46 is in the full-line position shown in Fig. 2. As no air-humidifying steam is being supplied, the relative humidity within the kiln drops, so that there is more evaporation from the wick 43 and therefore a decrease in the wet-bulb temperature with relation to the dry-bulb temperature. This results in a decrease in the pressure exerted in the wet-bulb motor-member 38, so that relatively the pressure of the dry-bulb motor-member 37 predominates more and more over that of the wet-bulb motor-member 38 and lifts upward the shifter rod 35 and the right-hand end of the lever 46.

At first, this does not affect the valve stem 33 and valve-member 31, because of the lost-motion connection 34. As the upward movement of the shifter rod 35 continues, the lever 46 passes through the horizontal position, so that it tilts downward toward the left. Then the shifting weight 49 slides down-hill along the lever 46 toward the fulcrum 47 until stopped by the stop 50. This movement of the weight 49 lessens its mechanical advantage, for it helps hold the shifter rod 35 downward against the pressure of the dry-bulb motor-member 37, and because of this sudden reduction in the resistance to the operation of the motor-member 37 such dry-bulb motor-member now quickly lifts the shifter rod 35 the remainder of its distance. This moves the lever 46 to the dotted-line position in Fig. 2, and also, as the lost-motion of the connection 34 has now been taken up, it lifts the valve stem 33 to open the valve 30. The opening of this valve admits air-humidifying steam to the coils 12, and this steam causes the rather rapid humidification of the air in the kiln 10, raising it quickly from the low point to which it had fallen to or nearly to 100%.

This rapid raising of the relative humidity also simultaneously raises to some extent the temperature in the kiln, (though this temperature rise is ignored in the rather idealized time-temperature diagrams of the drawings,) even though the temperature-control regularly shuts off the heating steam, because the humidifying steam inevitably brings in heat with it, and this heat is given up by the steam, mainly from its latent heat; and this causes a rising in temperature in the lumber, even in the interior thereof. In addition, this steam softens and temporarily moistens the surface of the lumber, by adding moisture to such surface, and thus makes easier the subsequent passage of moisture therethrough from the interior.

During part of each period during which the relative humidity is dropping, the temperature within the body of the lumber is higher than that within the remainder of the kiln, due to the heating effect from the latent heat of the steam during the humidifying period. This is due to the fact that the interior of the lumber is heated during the rise in temperature while humidifying steam is being admitted, but the temperature is quickly brought back to normal in the air of the kiln by the temperature controller as soon as the humidifying steam is shut off, thus lowering the temperature of the air in the kiln below the temperature which the interior of the lumber has attained. As a result of this over-temperature of the interior of the lumber at certain times, a still greater tendency to drive the moisture out to the surface of the lumber is produced, as moisture tends to flow in wood from a point of higher temperature to a point of lower temperature. This flow of moisture from the inside out is made easier by the recurrent softening produced by the humidifying steam on the surface parts of the lumber.

The temporary rises in temperature in the kiln during the humidifying periods are superposed on the normally constant temperature which the temperature-controller otherwise substantially maintains, and save at these periods do not interfere with the maintenance of such normally constant temperature. (The maintenance of the temperature—the dry-bulb temperature—of the kiln substantially normal over a given period, save for these temporary rises during the humidifying periods, is desirable in practice; but it is but a minor part of my invention, and is not essential to the practice of my invention in its broader scope, as good results may be obtained by my invention if this feature is omitted or ignored, and, as explained later, my invention may even be practiced by using variations in the dry-bulb temperature alone, as well as by variations in the wet-bulb thermometer alone, to obtain the desired variations in relative humidity.)

As the relative humidity of the air in the kiln rises upon the opening of the humidity-control valve 30, the evaporation from the wick 43 becomes less rapid, so that the wet-bulb temperature rises; in consequence of which the pressure developed in the wet-bulb thermostat 42 increases, and acts through the motor-member 38 to force the shifting rod 35 gradually downward. At first, this does not affect the valve stem 33, because of the lost-motion connection 34; but when the downward movement of the shifter rod 35 has continued sufficiently far to make the lever 46 slant downward toward the right, the weight 49 slides outward on such lever 46 from the fulcrum 47, until stopped by the stop 51. This outward movement of the weight 49 increases its mechanical advantage, and causes the shifter rod 35 to move quickly downward the remainder of its distance, to take up the remainder of the lost-motion of the connection 34 and to move the valve member 31 to closed position to shut off the supply of air-humidifying steam. Thereupon the relative humidity in the kiln 10 gradually drops, until the low point is again reached.

Then the cycle above described is repeated. These cycles start at or near the beginning of the whole drying period, and continue throughout such period, under the automatic control described. The controlling moisture-value condition in the case just described is the difference between the thermostatic pressure developed by the dry-bulb and wet-bulb temperatures. For constant dry-bulb temperature, such difference corresponds to a definite relative humidity which then is thus in effect the controlling moisture-value condition.

In Fig. 7 I have given a somewhat idealized chart showing the variation in humidity through several cycles, it being assumed that the dry-bulb temperature in the kiln 10 remains constant, under the control of the valve 20. Indeed, this chart of Fig. 7 indicates fairly well the conditions even though the temperature in the kiln 10 is not maintained constant, but is allowed to vary at random or under some system of variation such as a gradual increase throughout the drying period. In other words, even though the dry-bulb temperature varies, the apparatus of Figs. 1 and 2 will cause a fluctuation in the relative humidity between relatively constant maximum and minimum values, though these may not be absolutely constant when the dry-bulb temperature changes. This fluctuation is an example of the wide fluctuation or variation my invention contemplates, with the rises rapid and the lowerings gradual.

In the arrangement shown in Fig. 3, I eliminate the dry-bulb-temperature-controlled motor-member 37, and control the valve 30 wholly by the wet-bulb-temperature-controlled motor-member 38. Here the controlling moisture-value condition is wet-bulb temperature. This is not only entirely practicable, but is perhaps the simplest and most satisfactory form of control, especially if there is a definite control of the dry-bulb temperature of the kiln, as by the valve 20 under the control of the dry-bulb thermostat 23. For a given dry-bulb temperature, variations in relative humidity cause a corresponding variation in the pressure developed by the motor-member 38, to operate the valve 30 substantially as already explained. For a given temperature in the dry-kiln 10, the chart showing the relative-humidity variations will be substantially that of Fig. 7, just as with the arrangement of Figs. 1 and 2. If the dry-bulb temperature is changed from time to time, however, as is usually the case in lumber drying by reason of periodic increases in temperature from the beginning to the end of the drying period, the control arrangement shown in Fig. 3 will produce a chart substantially such as shown in Fig. 8, where the temperature is shown as starting as 130° and as increasing at various times, at the points indicated by the vertical dotted lines. In other words, with the arrangement shown in Fig. 3, there is a chart such as shown in Fig. 7 for each constant-temperature part of the drying period, but as between successive periods of higher temperature the line indicating the variations in relative humidity is vertically displaced, to a lower position on the chart for each increase in the dry-bulb temperature. There are sometimes some advantages in this.

It is sometimes desirable to have the successive peaks or troughs, or both, of the humidity-variation line at different heights. This can be obtained in either of the devices shown, by varying the lengths of successive movements of the weight 49 along the lever 46. I have shown one arrangement for doing this in Figs. 4, 5, and 6, which otherwise has the same arrangement of parts as in Fig. 2, with the shifter rod 35 operated by the opposing action of the two motor-members 37 and 38 responding respectively to the dry-bulb temperature and to the wet bulb temperature in the dry kiln 10. Here the stops 50 and 51 for the shifting weight 49 are not set by set-screws, as in Figs. 2 and 3, but instead one or both of them may be automatically shiftable along the lever 46, both stops being shown as thus shiftable. This shifting of one or both stops may be obtained in any suitable way, preferably by the tilting of the lever 46 itself. As shown, each of the stops 50 and 51 is connected by a longitudinally extending screw 60, swiveled in the stop, to an externally toothed nut 61 working between abutments 62 mounted on the lever 46 near its outer end. The teeth of the two toothed nuts 61 co-operate with tilting dogs 63 carried on any suitable fixed support 64, to cause turning of such nuts 61 in one direction only, by a ratchet action, upon each tilting movement of the lever 46. This may be arranged to produce any desired movements of the stops 50 and 51, or either of them; and by properly setting the dogs 63 the relative movements of the two stops may be anything desired. In Fig. 9 I have shown the effect of an automatic movement of the stop 51 outward by successive tiltings of the lever 46, the stop 50 being assumed to be stationary. By such movements of the stops 51 outward, the weight 49 moves successively further outward along the lever 46 upon successive downward swings of the right-hand end of the lever; in consequence of which it is necessary for the relative humidity to fall to successively lower values in the successive troughs of the humidity curve before the force of the wet-bulb - temperature - controlled motor - member 38 is diminished sufficiently to permit the right-hand end of the lever 46 to be tilted upward again.

In addition to controlling the temperature and the relative humidity in the kiln 10, I may also control the ventilation of the kiln, by the operation of the same valve 30 which controls the supply of air-humidifying steam. I have shown this diagrammatically in Fig. 1. Here a branch pipe 70 from the supply line 17 to the air-humidifying means extends to a fluid-pressure motor 71, shown as of the bellows type, which is connected to operate a lever 72. The lever 72 is suitably connected by a link 73 to a flapper valve 74 controlling the entrance to the air-intake duct 75, and is also connected by a link 76, a bell-crank 77, and a link 78 to butterfly valves 79 in the outlet flues 80. When the valve 30 is closed, the bellows 71 collapses under the action of a weight 150, adjustably carried by the lever 72 and opposing such bellows, to open the valves 74 and 79 during the time the air-humidifying steam is cut off, so that there will be ventilation and air-circulation during the humidifying-decrease parts of the time-humidity curves in Figs. 7, 8, and 9; but when the low-humidity point has been reached and the valve 30 has been opened to admit air-humidifying steam through the supply line 17 to the humidifying coils 12, part of the steam thus admitted passes through the pipe 70 and expands the bellows 71, to cause the closing of the valves 74 and 79 so long as such air-humidifying steam is being supplied. When the peaks of the curves in Figs. 7, 8, and 9 are reached to cause the closing of the valve 30, this not only shuts off the air-humidifying steam, but also permits the steam in the bellows 71 to escape through the steam-spray holes of the coils 12 so that such bellows again collapses, to cause the opening of the valves 74 and 79.

While in practicing my process, I prefer to obtain the control automatically, as for instance by the apparatus described above, I may also practice it by manually controlled apparatus, preferably with suitable indicating instruments for indicating the dry-bulb temperature and the wet-bulb temperature within the kiln. I have shown such an arrangement in Fig. 10. Here the heating and humidifying means within the kiln are the same as in the kiln shown in Fig. 1; and, as in Fig. 1, there are an air valve 74 at the air inlet and air valves 79 in the outlet flues. The steam for heating and humidifying is shown, as before, as coming from a common steam-supply line 15, and as being supplied through the pipes 16 and 17 to the heating and humidifying means respectively. In the pipes 16 and 17, however, in place of the automatic valves controlled by conditions in the dry kiln, I place hand valves 81 and 82, by which the supply of steam for heating and the supply of steam for humidifying may be controlled at will. (These hand valves are also provided even when there are automatic valves as in Fig. 1.) Further, the air valves 74 and 79 are controlled by hand, and are preferably interconnected, as shown being operated by a handle 83 which acts through suitable pull-and-push connections on such air valves. The valves 81, 82, 74, and 79 are controlled by the operator of the kiln to obtain the variations contemplated by my invention. To guide him in this, a suitable dry-bulb indicator 84 and a suitable wet-bulb indicator 85 are provided at some convenient point, conveniently in the control pit just outside the kiln. These dry-bulb and wet-bulb indicators may be of any suitable sort, but are shown as being connected by pipes 86 and 87 to a suitable dry-bulb thermometer 88 and a suitable wet-bulb thermometer 89, respectively; which two thermometers correspond to the thermostats 23 and 42 shown in Fig. 1. With these gages to guide him, the operator may control the rise and fall of relative humidity of the air in the dry kiln in accordance with any desired predetermined moisture-value conditions, such for instance as the wet-bulb temperature, the differential between wet-bulb temperature and dry-bulb temperature, the relative humidity as determined from the wet-bulb temperature and the dry-bulb temperature according to psychrometric tables, or any combination of these.

In operation, the heating valve 81 may be manipulated to maintain any desired dry-bulb temperature within the kiln, either constant or variable. For instance, if a constant dry-bulb temperature is desired, the valve 81 will be manipulated to maintain a constant indication of the dry-bulb indicator 84 throughout the drying period or such part of it as may be desired, to produce a dry-bulb temperature line substantially as shown by the full line marked "Dry Bulb A" in Fig. 11; whereas if it is desired that the dry-bulb temperature be increased throughout the drying period, that may be obtained by suitable manipulation of the valve 81 to get a gradually rising dry-bulb temperature, as indicated by the dotted line marked "Dry Bulb B" in Fig. 11. In addition, the humidity-valve 82 may be controlled to produce a variation in wet-bulb temperature between the wide limits contemplated by my invention, starting at or soon after the beginning of the drying process. This may be obtained by closing the valve 82 and letting it remain closed for a considerable period, preferably with the valves 74 and 79 open, so that the relative humidity within the kiln gradually falls for want of humidifying steam, over a considerable period of time, soon after which, when the wet-bulb temperature has fallen to the predetermined value, the humidity valve 82 is opened to admit humidifying steam to raise the wet-bulb temperature rather quickly to a value almost or quite equal to the dry-bulb temperature, thus quickly increasing the relative humidity of the air within the kiln until the predetermined high wet-bulb temperature is reached; after which the valve 82 is again closed and the cycle repeated. The variation in wet-bulb conditions are indicated by the wave lines in Fig. 11, with the full line marked "Wet Bulb A" indicating the conditions if the dry-bulb temperature is maintained substantially constant as shown by the "Dry Bulb A" line, and with the dotted line "Wet Bulb B" indicating the conditions if the dry-bulb temperature is gradually increased. This diagram takes no account of minor variations, which may occur in practicing my process, nor of the increases which usually and almost inevitably occur in the dry-bulb temperature upon the raising of the wet-bulb temperature and which I make use of to advantage in practicing my invention.

In order to expedite the raising of the wet-bulb temperature, I prefer to close the air valves 74 and 79 during the time the humidity valve 82 is open.

My invention may also be practiced by varying the dry-bulb temperature, with a more or less constant wet-bulb temperature; as that also produces a variation in relative humidity. This is indicated in Fig. 12. Thus by adjusting the humidity valve 82 to obtain a uniform wet-bulb temperature, as indicated by the "Wet Bulb A" line in Fig. 12, or to obtain a gradually rising wet-bulb temperature as indicated by the dotted line "Wet Bulb B" line in Fig. 12, I may get the desired variations in relative humidity by alternately opening and closing the heating valve 81, to produce a variation in dry-bulb temperature as indicated by the wave line marked "Dry-Bulb" in Fig. 12. This line shows relatively rapid decreases in dry-bulb temperature, alternating with relatively slow increases in dry-bulb temperature. The decreases in dry-bulb temperature preferably approach nearly or quite to the wet-bulb temperature line; while the increases in dry-bulb temperature rise considerably above the wet-bulb temperature line. Upon decreases and increases, respectively, in the dry-bulb temperature, the wet-bulb temperature remaining constant, there are increases and decreases respectively in relative humidity. In Fig. 12 I have also ignored other variations in both the wet-bulb and dry-bulb temperature.

While I may practice my invention by varying either the wet-bulb temperature or dry-bulb temperature, or both, as indicated in Figs. 11 and 12, I prefer the variations in which the dry-bulb temperature is maintained more or less constant, at least for a given part of the drying period, and the variation in relative humidity is obtained fundamentally by varying the wet-bulb temperature, with such variations in dry-bulb temperature as necessarily accompany the action of the humidifying steam.

The full lines in Fig. 11 indicate time-temperature relations corresponding in general to the time-humidity relations shown in Fig. 7; and so also does the diagram of Fig. 12. The dotted lines of Fig. 11 indicate time-temperature relations corresponding generally to the time-humidity relations indicated in Fig. 8, but with a uniform increase in dry-bulb temperature instead of the step-by-step increase which Fig. 8 contemplates.

The time-temperature relations shown in Fig. 11, and the various time-humidity relations shown in Figs. 7, 8, and 9, may be obtained either with a manual control, such as shown in Fig. 10, or with automatic control, such as shown if Figs. 1 to 6 inclusive and in Fig. 15.

If desired, I may use a combination of automatic and manual control, as by the apparatus shown in Fig. 13. Here the heating of the kiln is controlled by an automatic valve 20, corresponding to that shown in Fig. 1, and responsive to variations in dry-bulb temperature in the kiln, by being connected by a pipe 22 to a dry-bulb thermostat 23 within such kiln; while the humidification is controlled by an automatic valve 30' responsive to hygrometric conditions within the kiln. The valve 30' may be of the two-bellows type illustrated in Figs. 2 and 4, or of the one-bellows type illustrated in Fig. 3, except for the sliding weight 49, and if desired omitting the lost-motion connection 34, or of the type shown in my prior Patent No. 1,315,517, granted September 9, 1919. I have illustrated the valve 30' connected to two pipes 39 and 40, corresponding to those of Fig. 1, and leading respectively to dry-bulb and wet-bulb thermostats 41 and 42 within the kiln. The valves 20 and 30' are connected to suitable counterweighted levers 91 and 46 respectively, on which are suitable adjustable counterweights 92 and 93 for adjustment to get the desired action. There need be no sliding weight 49, such as shown in Figs. 1, 2, 3, and 4. Instead, the counterweights 92 and 93, or either of them, may be adjusted manually to get the desired variation in dry-bulb temperature or in wet-bulb temperature, or both, as may be desired. With any such setting of the counterweights, the automatic control of the valves 20 and 30' tends to maintain a substantially constant dry-bulb temperature and a substantially constant wet-bulb temperature within the kiln. By adjusting the counterweight 92 alternately in and out, it is possible to obtain variations of the dry-bulb temperature in general following the "Dry Bulb" line of Fig. 12. By adjusting the counterweight 93 alternately in and out, it is possible to obtain variations of the wet-bulb temperature in general following the "Wet Bulb" lines of Fig. 11. These adjustments of the counterweights need be made only very occasionally, at the peaks and troughs of the curves, and in the interims the automatic action of the valve will serve to produce the desired dry-bulb or wet-bulb temperature variations.

The variations in relative humidity within the kiln may be obtained in various other ways than that described. One such other way may be mentioned, by way of example. There may be a forced draft through the kiln, of air from outside, as by a blower 95 as shown in Fig. 14. In this case, the variations in relative humidity may be obtained by varying the relative humidity of the air supplied to the kiln. To this end, the conduit 96 through which the air from the blower 95 is delivered to the kiln may be provided with a steam-spray (or water-spray) pipe 97, the steam (or water) to which is supplied by the pipe 17 under the control of the humidity valve 30; which control may be obtained in any of the ways already explained. This arrangement, like the other described, will produce the wide alternating variations in relative humidity which are contemplated by my invention.

Further, the control valve which the controlling apparatus operates need not be the main control valve, although it is so shown in the figures above described. Instead, the main humidity control valve may be controlled by any suitable interposed pilot mechanism, which in turn is operated by the controlling apparatus.

One such arrangement is shown in Fig. 15. There the controlling apparatus directly operates a pilot valve 130, which by its movements controls a supply of power to suitable power-operated mechanism for the main valve 30. This arrangement may take various forms, and only one example is shown.

The controlling apparatus proper is that already described, and may be governed in either way already described, either by wet-bulb variations alone or by wet-bulb and dry-bulb variations jointly. The valve-stem 33 of the control valve—in this case it is the stem of the pilot valve 130—moves up and down in the manner already described upon variations in the governing conditions. The pilot valve 130 controls the connections of a fluid-pressure-supply pipe 131 and of a waste pipe 132 to two pipes 133 and 134 which lead to the two ends of a cylinder 135 in which there is a piston 136 attached to the stem 137 of the main valve 30 to be controlled. When the valve 30 is open and the relative humidity rises, as previously described, the valve-stem 33 is eventually moved downward from the upper position in which it is shown to its lower position; in which latter position it connects the pressure-supply pipe 131 to the pipe 133 leading to the upper end of the cylinder 135 and connects the pipe 134 from the lower end of such cylinder to the waste pipe 132, so that the fluid-pressure will force the piston 136 downward from the position shown to close the main valve 30 and thus cut off the supply of humidifying steam. As the relative humidity now falls, as previously described, the valve stem 33 is eventually moved to its upper position; in which position it reverses the connections from the pipes 131 and 132 to the pipes 133 and 134 and admits pressure to the lower end of the cylinder 135 while allowing the fluid to waste from the upper end of such cylinder, so that the piston 136 will move upward to open the main valve 30 to admit humidifying steam to cause the relative humidity again to increase.

The particular apparatus which has been described above as capable of use in practicing my invention is not essential to my present invention, and any suitable apparatus may be used therefor.

In claiming my invention, I have presented the claims in a number of groups for convenience, with analogous claims in each of the first two groups and corresponding distinctions between one group and the other, and with the third group of claims presenting more or less isolated claims.

I claim as my invention:

*First group.*

1. The method of dry-kiln operation, which consists in exposing in the kiln the material to be dried to air, and repeatedly alternately lowering and raising the relative humidity of such air between wide limits, with low limits far below a value which would be safe for the material if continued.

2. The method of dry-kiln operation set forth in claim 1, and in addition raising the temperature of the air as the drying continues.

3. The method of dry-kiln operation set forth in claim 1, and in addition lowering the lower limit of such variation as the drying continues.

4. The method of dry-kiln operation set forth in claim 1, and in addition lowering the lower limit of such variation and raising the temperature of the air as the drying continues.

5. The method of dry-kiln operation set forth in claim 1, and in addition lowering both the upper and lower limits of such variation as the drying continues.

6. The method of dry-kiln operation set forth in claim 1, and in addition lowering both the upper and lower limits of such variation and raising the temperature of the air as the drying continues.

7. The method of dry-kiln operation set forth in claim 1, with the addition that the raising is much more rapid than the lowering.

8. The method of dry-kiln operation set forth in claim 1, with the addition that the raising of such relative humidity is much more rapid than the lowering thereof, and that the temperature of the air is raised as the drying continues.

9. The method of dry-kiln operation set forth in claim 1, and in addition permitting air-circulation through the kiln during such lowering and preventing such air circulation during such raising.

10. The method of dry-kiln operation set forth in claim 1, and in addition circulating air into and out of the kiln from and to the atmosphere while the relative humidity is falling, and preventing such circulation into and out of the kiln while the relative humidity is rising.

11. The method of dry-kiln operation, which consists in exposing in the kiln the material to be dried to air, and repeatedly alternately lowering and raising the relative humidity of such air, the lowering being to a value materially lower than the mean relative humidity throughout the drying period, and the raising being to a value materially higher than such mean relative humidity.

12. The method of dry-kiln operation set forth in claim 11, and in addition circulating air through the dry kiln while the relative humidity is falling and preventing such air-circulation while the relative humidity is rising.

*Second group.*

13. The method of dry-kiln operation, which consists in exposing in the kiln the material to be dried to air, and repeatedly alternately lowering and raising the relative humidity of such air between wide limits which have predetermined moisture-valve conditions.

14. The method of dry-kiln operation set forth in claim 13, and in addition raising the temperature of the air as the drying continues.

15. The method of dry-kiln operation set forth in claim 13, and in addition lowering the lower limit of such variation as the drying continues.

16. The method of dry-kiln operation set forth in claim 13, and in addition lowering the lower limit of such variation and raising the temperature of the air as the drying continues.

17. The method of dry-kiln operation set forth in claim 13, and in addition lowering both the upper and lower limits of such variation as the drying continues.

18. The method of dry-kiln operation set forth in claim 13, and in addition lowering both the upper and lower limits of such variation and raising the temperature of the air as the drying continues.

19. The method of dry-kiln operation set forth in claim 13, with the addition that the raising is much more rapid than the lowering.

20. The method of dry-kiln operation set forth in claim 13, with the addition that the raising of such relative humidity is much more rapid than the lowering thereof, and that the temperature of the air is raised as the drying continues.

21. The method of dry-kiln operation set forth in claim 13, and in addition permitting air-circulation through the kiln during such lowering and preventing such air circulation during such raising.

22. The method of dry-kiln operation set forth in claim 13, and in addition circulating air into and out of the kiln from and to the atmosphere while the relative humidity is falling, and preventing such circulation into and out of the kiln while the relative humidity is rising.

23. The method of dry-kiln operation, which consists in exposing in the kiln the material to be dried to air, and repeatedly alternately lowering the relative humidity of such air to predetermined low moisture-value conditions and raising it to a point approximating saturation.

24. The method of dry-kiln operation set forth in claim 23, and in addition circulating air through the dry kiln while the relative humidity is falling and preventing such air circulation while the relative humidity is rising.

*Third group.*

25. The method of drying wood, which consists in exposing the wood to air, and repeatedly alternately lowering and raising the relative humidity of such air, the lowering being to predetermined low moisture-value conditions, and the raising being to predetermined high moisture-value conditions.

26. The method of drying wood, which consists in exposing the wood to air, and repeatedly alternately lowering and raising the relative humidity of such air, the lowering being to predetermined low moisture-value conditions, and the raising being to a point approximating saturation.

27. The method of drying lumber, which consists in exposing the lumber to air, humidifying the air by spraying steam thereinto, and repeatedly alternately shutting off and turning on such steam.

28. The method of dry-kiln operation, which consists in exposing in the kiln the material to be dried to air, and repeatedly alternately lowering and raising the relative humidity of such air between wide limits, with low limits which occur early in the process and are followed shortly by raisings of the relative humidity.

29. The method of drying wood, which consists in exposing the wood to air, and repeatedly alternately lowering and raising the relative humidity of such air between wide limits, with low limits early in the drying process which are far below the minimum values which would be necessary to prevent case-hardening of the wood if such values were continued.

30. The method of drying wood, which consists in exposing the wood to air, and repeatedly alternately lowering and raising the relative humidity of such air between wide limits, with low limits which are far below the minimum values which would be necessary to prevent case-hardening of the wood if such values were continued.

31. The method of dry-kiln operation, which consists in exposing in the kiln the material to be dried to air, repeatedly alternately lowering and raising the relative humidity of such air between wide limits, and lowering both the upper and lower limits of such variation as the drying continues.

32. The method of dry-kiln operation, which consists in exposing in the kiln the material to be dried to air, repeatedly alternately lowering and raising the relative humidity of such air between wide limits, and permitting air-circulation through the kiln during such lowering and preventing such air circulation during such raising.

33. The method of drying wood, which consists in repeatedly alternately lowering and raising the moisture content of the surface of the wood by changing the moisture-value conditions of the air surrounding such wood repeatedly and alternately between predetermined low and high values.

34. The method of drying wood set forth in claim 33, and in addition lowering at least one of such predetermined values as the drying process continues.

35. The method of dry-kiln operation, which consists in exposing in the kiln the material to be dried to air, and repeatedly alternately increasing the temperature of the entire material and decreasing the temperature of the surface of the material, with such alterations beginning early in the process and occurring through a large portion of the process.

36. The method of dry-kiln operation, which consists in exposing in the kiln the material to be dried to air, and repeatedly alternately increasing the temperature of the entire material and decreasing the temperature of the surface of the material, with such decreasings occurring early in the process and being shortly followed respectively by such increasings.

37. The method of dry-kiln operation set forth in claim 36, with the addition that said alternations occur through a large portion of the process.

38. The method of dry-kiln operation, which consists in subjecting in the kiln the material to be dried to air, and repeatedly alternately increasing the dry-bulb temperature of the air and decreasing the wet-bulb temperature of the air, such decreasings occurring early in the process and each decreasing being shortly followed by such an increasing.

39. The method of dry-kiln operation set forth in claim 38, with the addition that such alternations continue more or less constantly throughout a large portion of the process.

In witness whereof, I have hereunto set my hand at Indianapolis, Indiana, this 19th day of October, A. D., one thousand nine hundred and twenty three.

ARTHUR E. KRICK.